UNITED STATES PATENT OFFICE.

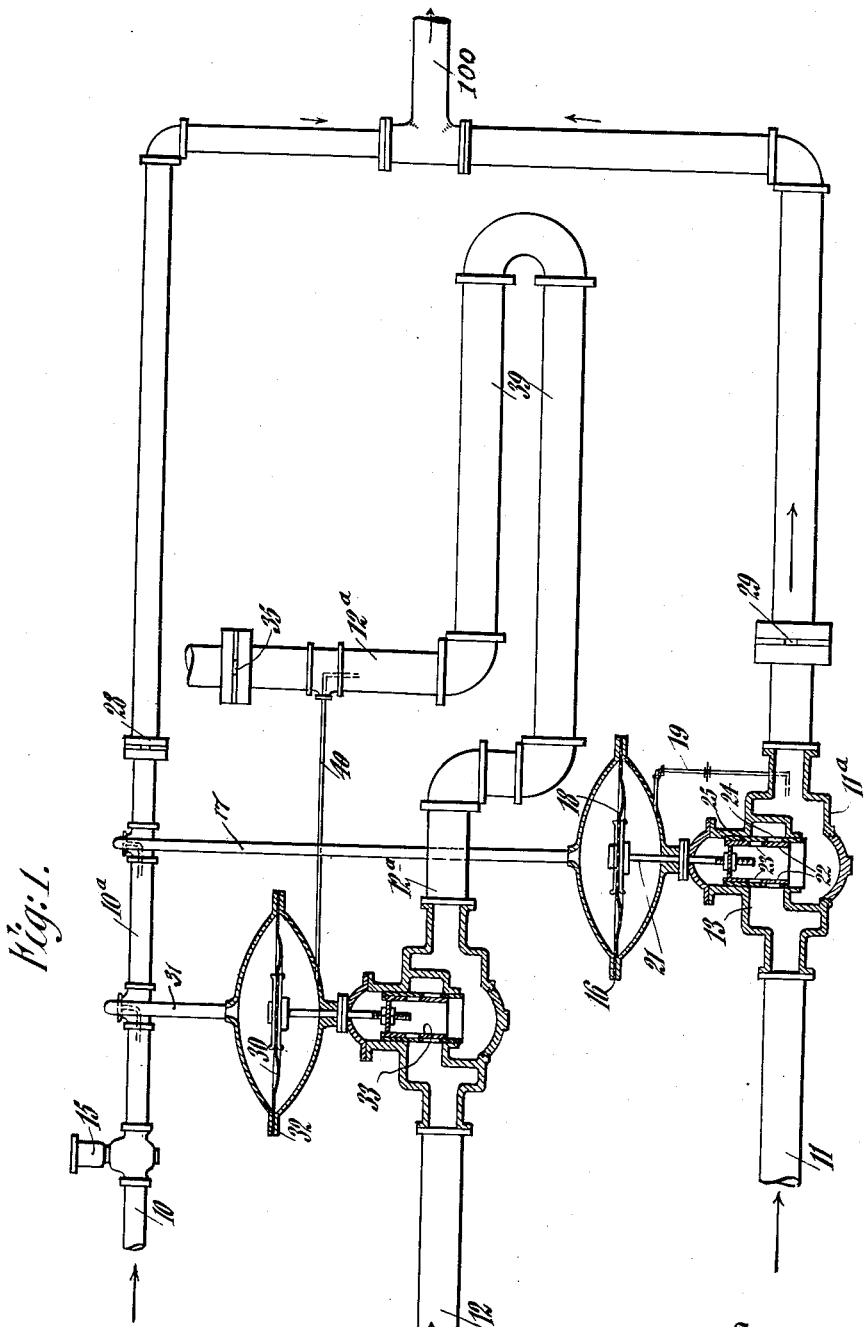

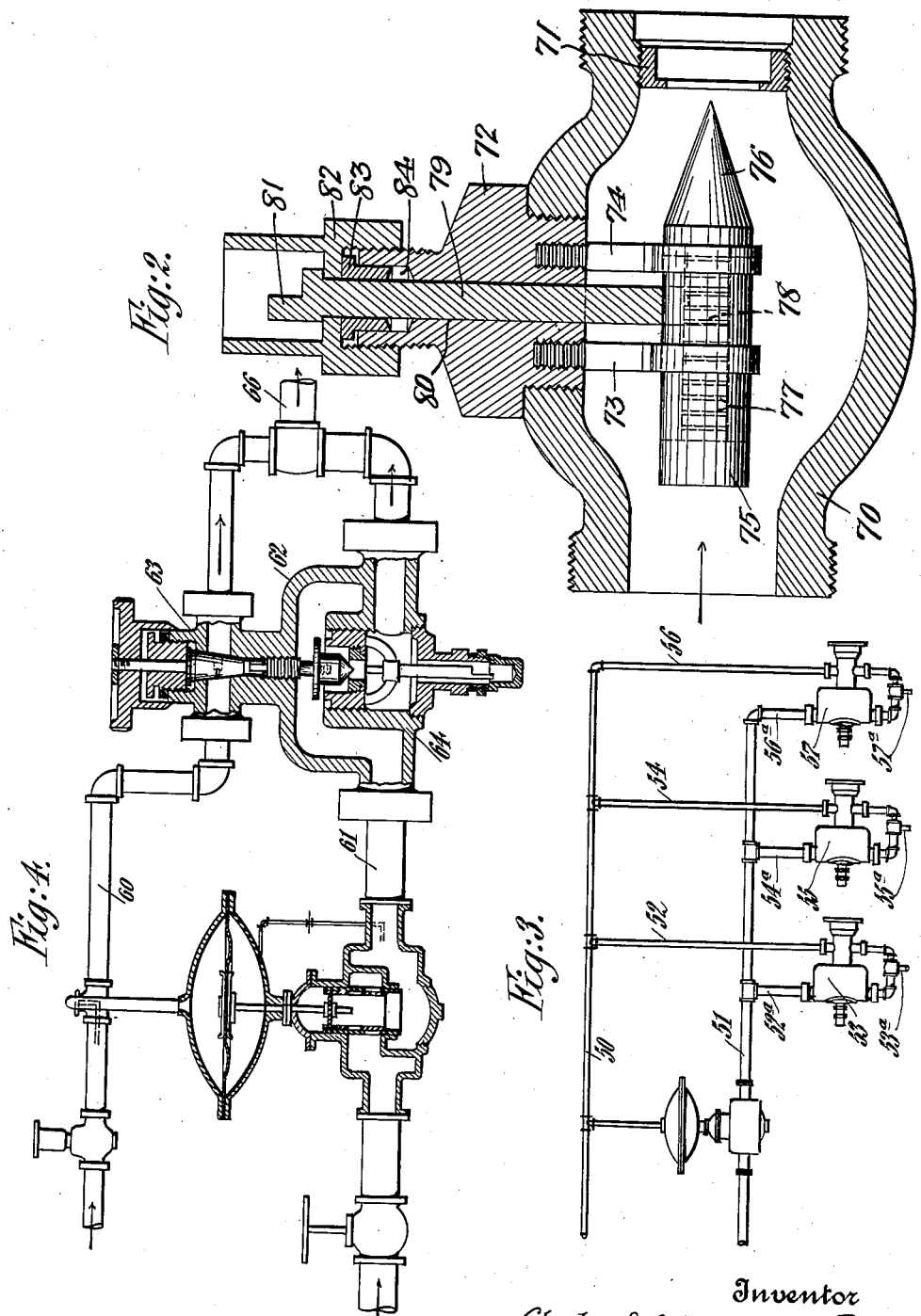

CHARLES S. COLLINS, OF NEW YORK, AND LOUIS ROESSEL, OF BROOKLYN, NEW YORK.

PROPORTIONING-REGULATOR FOR FLUIDS.

1,290,513.  Specification of Letters Patent.  Patented Jan. 7, 1919.

Application filed July 30, 1918. Serial No. 247,469.

*To all whom it may concern:*

Be it known that we, CHARLES S. COLLINS, a citizen of the United States, and a resident of the borough of the Bronx, city and State of New York, and LOUIS ROESSEL, a citizen of the United States, and a resident of the borough of Brooklyn, city and State of New York, have jointly invented new and useful Improvements in Proportioning-Regulators for Fluids, of which the following is a specification.

This invention is applicable to the regulation of proportions of mixtures of fluids, such as liquid and liquid, liquid and gas, gas and liquid, or gas and gas, as the case may be, and in this regard permits also other modifications. The invention is applicable to blending of liquids, (as alcohols with oils), the proportional mixing of gas and liquid, ($CO_2$ and water), the proportional mixing of gas with gas, (as hydrogen, acetylene, natural or artificial full gases with an oxidizing agent, as oxygen, air, or air and oxygen). The object of the invention is to provide a method and means of maintaining a constant though variable proportion of these fluids.

This invention relates to regulated proportioning of fluids, and has for its object to provide specially accurate means for regulating the proportional mixture of fluids. The invention contemplates a novel method of regulation, as also novel apparatus by means of which the regulation may be carried out and both the method and apparatus will be herein finally claimed, and embodiments thereof will be hereinafter described.

In the drawings, Figure 1 shows a diagrammatic view partly in section of an installation; Fig. 2 shows a section of an adjustable orifice; Fig. 3 shows an arrangement of connections of a practical embodiment of the invention, and Fig. 4 shows another embodiment.

Similar characters of reference indicate corresponding parts throughout the drawings.

In the drawings there are shown various embodiments of the invention and practical forms of apparatus used, by which a predetermining proportioning may be obtained.

In the drawings, the supply line 10 conducts one of the fluids and the supply line 11 also conducts a fluid, either of the same kind as that conducted by the supply line 10 or of a different kind, and either of the same pressure or of a different pressure. The object desired is that the supply lines 10 and 11 have at the common union 100, an equal pressure or an equal head. The pressure at the inlet end of the supply line 10 constitutes the primary pressure and the pressure at the inlet end of the supply line 11 constitutes the secondary pressure in respect to the primary pressure. It becomes necessary to compensate the secondary pressure to the primary pressure during maintenance of the secondary pressure in a constant relationship to the primary pressure for regulating the rate of flow against heads or pressures equal in respect to each other. For this purpose, one embodiment, consists in providing the supply pipe 10 with a manually or mechanically controlled valve 15, the operation of which determines the primary pressure in the portion $10^a$ of the supply line 10. This portion or pipe $10^a$ is in communication with a pressure compensator 16, by means of a pipette 17 or other means of communication, and the primary pressure in pipe $10^a$ thereby determines the pressure on one side of the diaphragm 18 of the compensator 16. Instead of the diaphragm a piston valve or other means may be provided. The other side of the diaphragm 18 is acted upon by the pressure of a portion of the supply line 11, that is, pipe $11^a$, for which purpose this supply pipe $11^a$ is in communication with the compensator 16 by a pipette 19 or other suitable means of communication. The diaphragm 18 is connected with a piston rod 21 which has its other end connected with a piston valve 22 having openings 23 registerable with openings 24 in the cylinder 25 of the valve. Instead of the piston valve described a butterfly valve or other means may be used. If the pressure on the primary side of the diaphragm is greater than that of the secondary side of the diaphragm, the diaphragm will move the piston rod downwardly (viewed in the manner of the drawings) and bring the openings 23 and 24 in registration with each other, and thereby permit more fluid to pass through the registerable openings of the valve. This will increase the pressure in pipe $11^a$, until the pressure in pipe $11^a$ is in a definite relationship to the pressure in pipe $10^a$. Whatever this proportion may be, it is maintained in constant relationship between the primary and secondary pressures, due to the regulation described. Assuming that the fluids in pipes 10 and 11 are at equal or varying pressures, the pressure of pipe 10 is reduced by control valve 15 to the pressure of required rate of flow through pipe $10^a$ and orifice 28. The rate of flow in the pipe $10^a$ is determined by the fixed orifice 28, as stated, and the rate of flow in the pipe $11^a$ is determined by the fixed orifice 29 in the pipe $11^a$, the fixed orifices just described being part of one embodiment of the invention. At the other side of the orifices 28 and 29, that is, at the outlet sides, the pressures or heads in the pipes are equal to each other. These outlet ends of the fixed orifices may be connected in union as at 100, as heretofore stated, to a receptacle or other source of use, the pressure of which determines, of course, the equal pressure at the outlet sides of the orifices 28 and 29. The piston valve 13 is controlled by the compensator 16, so that the pressures in pipe $11^a$, are in constant relationship. Thus, by the operation of the control valve 15, the primary pressure is determined, and this in turn causes the secondary pressure to be compensated in respect thereto, with the maintenance of a constant relationship between the two pressures, the rate of flow being regulated against heads or pressures equal to each other. It will also be noted that this control of pressures is done from a single valve. It will also be noted, that the flow from one side of the fixed orifice 28 under the primary pressure to the other side of the fixed orifice 28 at a final pressure, which is lower than the primary pressure, is maintained, and the quantity is determined by the area of the fixed orifice. Similarly, the flow from one side of the fixed orifice 29, under the secondary pressure, to the other side of the fixed orifice 29, at a final pressure, which is also lower than the secondary pressure, is maintained and the quantity is determined by the area of the fixed orifice. The rate of flow is in proportion to the primary and secondary pressure which are in constant relation to one another. The embodiment of the invention as far as described, has shown two supply pipes with one control valve, and with one compensator, and with fixed outlet orifices.

The invention contemplates also the use of a greater multiple of supply pipes. And the invention contemplates the use of regulable outlet orifices instead of the fixed orifices which have been described. For the purpose of providing an embodiment with a greater multiple of pipes, an additional supply pipe 12 is provided which in the drawings is shown intermediate the supply pipes 10 and 11, but, in practice, may be placed elsewhere, and, of course, additional supply pipes may be provided in any multiple. The pipe 12 is under an initial pressure at its inlet end, and this pressure acts on one side of a diaphragm 30 of a compensator 32 by means of a pipette 31 or other communicating means, and the compensator 32 is acted upon at the other side of the diaphragm 30 by a pressure, which is again a secondary pressure to the primary pressure in pipe $10^a$, and the action of the diaphragm controls a piston valve 33 permitting or restricting the flow of fluid therethrough in a manner as heretofore described with reference to valve 13. Instead of a piston valve a butterfly valve or other means may be used. To the inlet side of pipe 12, intermediate the position of the diaphragm piston valve 33 and the orifice 35 which in Fig. 1 is shown as a fixed orifice, a heating or refrigerating section 39 is placed in circuit, to heat or cool the fluid as described. To compensate for increased frictional resistance, of this section a pipette or other communicating means 40 connects the pipe $12^a$ at a point beyond the section 39, as shown in the drawings, with the compensator 32. If no heater or refrigerator section be used, then the pipette is preferably connected with the pipe $12^a$, and preferably adjacent the outlet side of the piston valve 33. The law of operation heretofore stated, controls the operation of the pressure in pipe $12^a$, or any multiple thereof. It will be seen that the pipes $11^a$ and $12^a$ containing the secondary pressures, are each connected with the pipe $10^a$ by means of pipettes or other means, and have compensators and valves controlled thereby. The primary pressure in pipe $10^a$ is the pressure between the control valve 15, if one be present, and the orifice 28, and this primary pressure determines the secondary pressures in the pipes $11^a$ and $12^a$, or any multiple thereof.

In Fig. 2 is shown a cross-section of the orifice 35 like orifice 28 or 29 shown in Fig. 1, but provided with means whereby the area of the orifice may be regulated as desired, in order to determine varying quantities of flow of fluids. This regulable orifice may be adjustable by any suitable means for changing the relative proportion of the quantities of flow. The embodiment disclosed, by way of example, comprises a valve casing 70 having an orificed bushing 71 screwed into one end and having at its upper side a removable head 72 provided with a pair of spaced depending brackets or bearings 73 and 74 in which there is slidably mounted a closure member 75 provided with a cone shaped end 76 adapted upon reciprocation of the member 75 to regulate the opening of the bushing 71. Rack teeth 77 are provided upon the side of the member 75 and these are engaged by the pinion end 78 of a shaft 79, disposed in a bore 80 of the head, and provided at its upper end with a key 81, disposed in the cap 82, screwed upon the end of the head 72 and bearing upon a packing ring 83 projecting into a pocket 84 of the head. By turning the shaft it will be seen the member 75 may be reciprocated into the desired relation with the orificed bushing.

As the fluids are delivered in the various pipe lines to their corresponding orifices under pressures constant in relation with each other, and as they flow against the same head or pressure, they will flow in the proportion of the ratio of the area of the orifices. The control valve 15, if one be present, by regulating the pressures at the orifices 28, 29, and 35, etc., on all lines, will regulate the rate of flow per unit of time, so that any rate possible with the initial head available may be obtained from the maximum to the minimum without change in the proportional quantities delivered.

The apparatus is useful for the blending of fluids in predetermined proportions volumetrically or gravimetrically, or in proportioning the rate of flow of fluids in respect to each other, or of a rate of flow of gas or gases to liquids, or liquids to gases, or gases to gases.

In Fig. 3 is shown an embodiment with a primary pressure pipe 50 and a secondary pressure pipe 51 with a compensator therebetween, and from these pipes 50 and 51, branch pipes 52 and 52ª lead to a controller 53, which may be similar to the controller 62 hereinafter referred to, discharging in a single outlet pipe 53ª, branch pipes 54 and 54ª lead to a controller 55, discharging in a single pipe 55ª, and branch pipes 56 and 56ª lead to a controller 57, discharging in a single pipe 57ª. Any further number of branch pipes and controllers may be provided. Thus in Fig. 3 is shown an arrangement of supply pipes with orifices to adjust two or more orifices in the same proportion so that several supplies can be taken off of the various lines in any combination desired after pressures have been regulated to constant relationship by means of the compensating valves as hereinbefore described.

In Fig. 4 is shown a supply pipe 60, and a secondary pipe 61 having a compensator therebetween, leading to a controller 62, which is so arranged that the primary flow at 63 determines the secondary flow at 64, and both flows merge into the outlet pipe 66. The construction of this controller 62 is shown but no claim is made herein to the construction thereof.

We have described several embodiments of our invention, but changes may be made without departing from the spirit of our invention, as defined in the appended claims.

We claim:

1. The method of regulating pressures of fluids, which consists in compensating initial pressures to each other, maintaining the pressures in a constant relationship to each other for the purpose of regulating the rate of flow of fluids in predetermined proportions through orifices, and varying either of the initial pressures for varying the quantities of fluids passing through the orifices.

2. The method of regulating the pressures of fluids, which consists in compensating a positive secondary pressure to a positive primary pressure, maintaining the positive secondary pressure in a constant relationship to the positive primary pressure, for the purpose of regulating the rate of flow of fluids in predetermined proportions through orifices, varying the positive primary pressure, and then compensating the positive secondary pressure in respect to the changed positive primary pressure.

3. The method of regulating pressures of fluids, which consists in compensating initial pressures to each other, maintaining the pressures in a constant relationship to each other for the purpose of regulating the flow of fluids in predetermined proportions through orifices, and varying the quantities of fluids passing through the orifices, in accordance with the changes of the orifices which correspond to the respective pressures.

4. A pressure compensating regulator, comprising a main supply pipe having an outlet orifice, a secondary supply pipe having an outlet orifice, and positive pressure compensating means between the two supply pipes and operated by the positive pressures in the supply pipes, said positive pressure compensating means disposed only at the inlet sides of the orifices.

5. A pressure compensating regulator, comprising a main supply pipe having a fixed outlet orifice, a secondary supply pipe having a fixed outlet orifice, and positive pressure compensating means between the two supply pipes and operated by the positive pressures in the supply pipes disposed only at the inlet side of the fixed orifices.

6. A pressure compensating regulator, comprising a main supply pipe, and a plurality of secondary supply pipes, all of said supply pipes having outlet orifices, and positive pressure compensating means between each secondary supply pipe and the main supply pipe, disposed only at the inlet ends of the orifices.

7. A pressure compensating regulator, comprising a main supply pipe having an outlet orifice, a control valve in the main supply pipe and at the inlet side of the orifice, positive pressure compensating means connected with the main supply pipe between the control valve and the inlet side of its orifice, and with a secondary pipe at the inlet side of its orifice.

8. A pressure compensating regulator, comprising a main supply pipe, having an outlet opening, a positive pressure compensator connected with the main supply pipe, a secondary supply pipe having an outlet opening, a heater or refrigerator in the secondary supply pipe, and a connection between the heater or refrigerator and the outlet opening of the secondary pipe connecting with the positive pressure compensator.

9. A pressure compensating regulator, comprising a main supply pipe having an outlet orifice of a predetermined area, a control valve in the main supply pipe and at the inlet side of the orifice, secondary supply pipes each having predetermined outlet orifices, positive pressure compensating devices between each secondary pipe, and the main supply pipe having their connections between the inlet ends of the supply pipes and only at the inlet sides of the orifices, whereby the operation of the control valve regulates the positive pressure in the main supply pipe and the positive pressure compensating devices regulate the positive pressure in the secondary supply pipes in proportion to the positive pressure of the main supply pipe, said positive pressures acting against an equal head in the pipes at the outlet sides of the orifices.

10. The method of regulating pressures of fluids, which consists in compensating positive secondary pressures to a positive primary pressure and maintaining the positive secondary pressures in a constant relationship to the positive primary pressure, for the purpose of regulating the rate of flow of fluids in predetermined proportions through orifices.

11. The method of regulating pressures of fluids, which consists in compensating initial pressures to each other, maintaining the pressures in a constant relationship to each other for the purpose of regulating the rate of flow of fluids in predetermined proportions through orifices, and varying one of the initial pressures and then compensating the other pressures in respect to the changed initial pressure.

12. The method of regulating pressures of fluids, which consists in compensating initial positive pressures to each other, maintaining the positive pressures in a constant relationship to each other, for the purpose of regulating the flow of fluids in predetermined quantities through orifices, and varying the quantities of fluids passing through the orifices, in accordance with the changes of the orifices, which correspond to the respective positive pressures.

In testimony that we claim the foregoing as our invention, we have signed our names.

CHARLES S. COLLINS.
LOUIS ROESSEL.